UNITED STATES PATENT OFFICE.

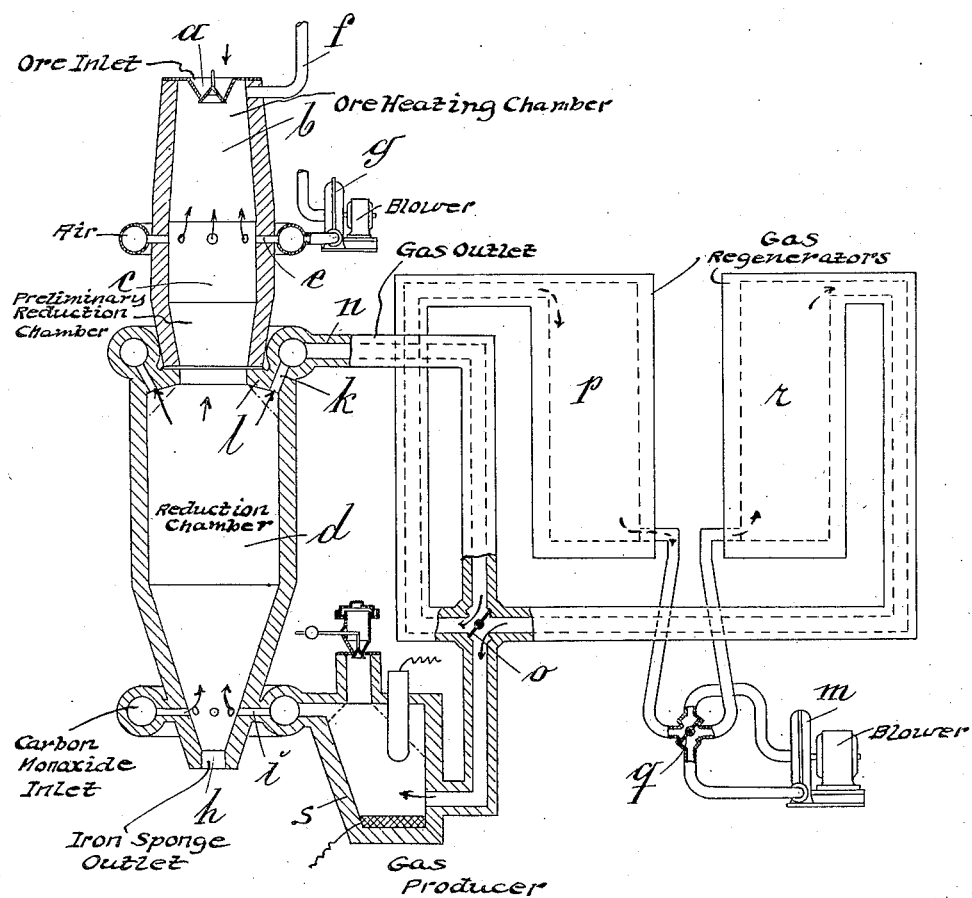

FRANS MARTIN WIBERG, OF FALUN, SWEDEN.

METHOD OF AND FURNACE FOR REDUCING ORES AND OXYGEN COMPOUNDS UTILIZED AS ORES.

1,401,222.   Specification of Letters Patent.   Patented Dec. 27, 1921.

Application filed June 24, 1919. Serial No. 306,367.

*To all whom it may concern:*

Be it known that I, FRANS MARTIN WIBERG, subject of the King of Sweden, residing at Falun, in the Kingdom of Sweden, have invented certain new and useful Improvements in the Method of and Furnace for Reducing Ores and Oxygen Compounds Utilized as Ores, of which the following is a specification.

My present invention relates to a method of reducing ores and more particularly to the reduction of iron ores but which can also be used for the reduction of the ores of other metals. The object of the invention is to effect a saving of combustible and electrical energy in comparison with hitherto known methods.

According to the present method the reduction is carried out according to the counter current principle by means of a gas which principally consists of carbon monoxid. The novel feature consists in dividing the reduction process into two stages in such a way that the gas current, before having passed through the whole ore mass, is divided so that one part of the same is removed from the reduction furnace while the remaining part of the same continues through the ore mass and acts to further reduce on the same. The portion of the gas removed from the furnace, and which by combining with the oxygen of the ore has obtained a certain percentage of carbon dioxid, is led through a layer of carbonaceous material which is heated to a suitable temperature whereby the greater part of the carbon dioxid is transformed into carbon monoxid which is again used for the reduction of the ore. The portion of the gas which has not been removed from the reduction furnace and which is allowed to continue its reducing action on the ore will in this manner obtain a higher percentage of carbon dioxid. Due to the states of equilibrium which appear in the reduction of the iron oxid by carbon monoxid it is not possible to completely transform all of the carbon monoxid into carbon dioxid but the gas will after the reduction continuously contain carbon monoxid which is utilized, by being burnt, for delivering the quantity of heat required for heating the ore to a suitable temperature of reduction before being exposed to the reducing action of the gas.

By dividing in this manner the reduction of the ore into two stages and employing different gas quantities for said stages, it will be possible to utilize the reducing action of the carbon monoxid in a more complete manner than if the reduction had been carried on with all of the gas. In order to elucidate this the following examples are cited:

Pure $Fe_3O_4$ is reduced with pure CO at for instance 900° C. and it is supposed that the reduction takes place in such a manner that $Fe_3O_4$ is first reduced to FeO and then FeO to Fe. On reducing $Fe_3O_4$ to FeO at 900° the relation $CO_2:CO$ is $=3$ at the state of equilibrium, and at the reduction of FeO to Fe the same relation is $=0.4$. The reduction is supposed to take place continuously according to the counter current principle and under so favorable circumstances as possible, *i. e.* so that the state of equilibrium is obtained. The progress will then be as follows:

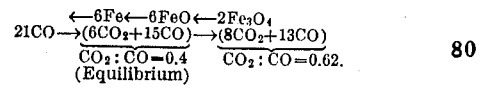

The relation $CO_2:CO$ in the escaping gas can thus not obtain a higher value than 0.62 since the state of equilibrium at the reduction of FeO to Fe prevents this. However, by taking out a portion of the gas, according to my present invention, a considerably higher value of the relation $CO_2:CO$ can be obtained as will be clear from the following:

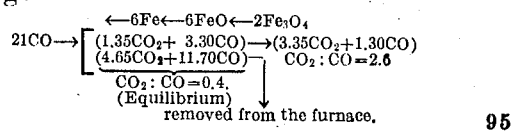

The relation $CO_2:CO$ can thus, by dividing the gas current, be augmented from 0.62 to 2.6. The greatness of the removed gas quantity is so adapted that it is sufficient for the producing of all the carbon monoxid which is required for the reduction of the ore which is executed by leading the gas through an incandescent layer of carbonaceous material:

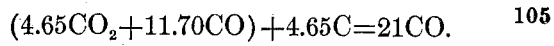

This reaction is endothermical and requires, consequently, a supply of heat, which can take place for instance by supplying electrical energy.

Due to the very complete utilization of the carbon monoxid for the reduction of the ore which is rendered possible by this invention and to the utilizing of the heat value of the gas escaping after the reduction of the ore for heating the ore to the reduction temperature, the consumption of carbon or carbonaceous material and electrical energy for the execution of the process will be considerably lower than in the previously known methods.

The carbon monoxid remaining in the gas after the reduction will always be sufficient to deliver, by combustion, the heat required for heating the charge to the temperature of reduction, since if the reduction from one reason or the other is too intense so that the percentage of carbon monoxid of the gas decreases, even its temperature of combustion will decrease so that the charge becomes colder and the intensity of the reduction is diminished. By this means an automatic regulation of the temperature in the zone of combustion is obtained.

The portion of the gas removed for regeneration leaves the reduction furnace at a high temperature. If it is not possible to introduce the same at this temperature into the blower, which effects its movement, it ought to be cooled before entering into the blower. However, if it is introduced in a cool state into the furnace where the reduction of the carbon dioxid to carbon monoxid is effected, it would cause too great losses of heat, and for this reason the cooling of the gas ought to be performed in such a manner, that the same, after having escaped from the reduction furnace, is directed alternately through one of two regenerators in which it is allowed to emit its heat before entering into the blower. Afterward it is again heated to the highest possible degree in the other regenerator before entering into the furnace adapted for the reduction of the carbon dioxid. Instead of regenerators, a recuperator may be used.

In the accompanying drawing a side view partly in section of a furnace for carrying the method into practice is shown. The ore is introduced through an open or closed throat $a$ into a shaft, consisting of three compartments $b$, $c$ and $d$, respectively. In the compartment $b$ the ore is heated to a suitable reduction temperature by the combustion of gas ascending from the compartment $c$. The combustion is performed by introducing air through the openings $e$, which may be attained either by producing a draft by means of a chimney $f$ or by the use of a blower $g$. In the compartments $c$ and $d$ the reduction of the ore takes place, and then the spongy iron obtained is removed at the lower end $h$ of the shaft. The reduction is accomplished by means of carbon monoxid, which is introduced at the lower part of the shaft through openings $i$. The greatest part of the gas containing carbon dioxid and obtained after the reduction in the compartment $d$ is removed through the openings $k$ for regeneration while the smaller part continues to move upward through the compartment $c$, which may, therefore, have a smaller cross-section than the compartment $d$. The compartments $c$ and $d$ are interconnected by a contracted neck $l$, the inclination of which is smaller than the fall angle of the charge, whereby the advantage is gained that a free space is formed between the neck and the descending charge, so that a more uniform exhaustion of the gas may be obtained than would be the case if the charge were in contact directly with the discharge openings $k$. That part of the gas escaping from the compartment $d$ which is not removed for regeneration continues to move upward through the compartment $c$, in which its reducing capacity is utilized still more, before it enters into the compartment $b$, in which the combustible constituents remaining from the reduction are burnt out.

The gas removed through the openings $k$ for regeneration is drawn by means of an exhausting blower $m$ through a heat insulated conduit $n$ having a valve $o$ into a regenerating chamber $p$, in which it emits a sufficient quantity of heat so as to be cooled down at the exit from the regenerator to a temperature suitable for entrance into the blower. Arranged between the regenerating chamber $p$ and the blower $m$ is a valve $q$, which has for its object to facilitate the reversing of the direction of motion of the gas while maintaining the same direction of motion when passing through the blower. The gas is forced from the blower through the valve $q$ into the regenerating chamber $r$, in which it is heated to the highest possible degree by the heat, emitted in the said chamber at an opposite direction of motion of the gas, and, thereupon, the gas enters through the valve $o$ into a gas producer or carbureter in which it is forced through a layer of combustible heated by means of electrical arcs, so that the greater part of the carbon dioxid contained in the gas is reduced by the glowing combustible to carbon monoxid, which, together with the carbon monoxid already contained in the gas and the volatile constituents which may escape from the combustible, is forced through the openings $i$ into the shaft in order to be utilized for the reduction of the ore.

If the volatile constituents escaping from the combustible used in the carbureter, contain sulfurous gases it is disadvantageous to allow these constituents to enter with the gas into the shaft, and they should be removed from the gas, before the latter enters into the shaft. This may be performed either by mixing the combustible with an absorbent for the sulfur contained in the gas, for instance lime (or lime stone), or by forcing the gas, after having escaped from the layer of combustible, through or above a layer of such an absorbent, before entering into the shaft. A sulfurous combustible, for instance coke, may, thus be used for the reduction, without the sulfur contained in the same being mixed with the iron. As phosphorus does not escape in gas form at the gasifying of a combustible, also phosphorous combustibles may be used, without the phosphorus contained in the same being mixed with the iron.

If the blower be of a construction so as to be capable of working with gases of a high temperature, the two regenerators $p$ and $r$ and the valves $o$ and $q$ may be dispensed with, and the blower may be interposed in a heat insulated conduit between the openings $k$ and the furnace $s$. Obviously, instead of the blower any other suitable means may be used for moving the gas in the conduit between the openings $k$ and the furnace $s$.

Having now described my invention what I claim as new and desire to secure by Letters Patent is:

1. A method for reducing ores or oxygen compounds utilized as ores consisting in passing the ore through a chamber, moving a carbon monoxid gas through the chamber in a direction opposite to that of the direction of travel of the ore, causing the gas current, before it has passed through the whole ore mass and before its reducing capacity is wholly utilized, to be divided in such manner that part thereof is removed from the chamber, regenerating the carbon monoxid in the removed portion of the gas and again introducing the same into the chamber for use as a reducing gas, allowing the remaining part of the gas to continue through the ore mass and to exert a further reducing action on the said mass at a temperature suitable for the reduction, and in heating the ore to said temperature by introducing a material to the combustible constituents remaining in the latter part of the gas to cause combustion.

2. A process for reducing ores or oxygen compounds utilized as ores consisting in passing the ore through a chamber, moving a gas containing carbon monoxid through the chamber in a direction opposite to that of the direction of travel of the ore, producing said gas by the regenerating of the carbon monoxid in a part of the gas containing carbon dioxid formed by the reduction of the ore; dividing the reduction process into two different stages in such a manner that the portion of the gas adapted for the regeneration of carbon monoxid is removed from the reduction furnace before having passed through the whole mass of ore; while the remaining portion only of the gas is permitted to continue its passage through the whole mass of ore and to exert a further reducing action on the same at a temperature suitable for the reduction and obtained by combustion of the combustible constituents remaining in said portion of the gas after having finished its reducing action.

3. A process of reducing ore consisting in passing the ore into a chamber, producing carbon monoxid gas and passing the same into said chamber, causing the ore and gas to simultaneously travel in opposite directions, utilizing a portion of said gas to heat said ore, withdrawing a portion of the gas from said chamber and regenerating the withdrawn gas.

4. An apparatus for reducing ores comprising a vertical chamber, means permitting the introduction of ore to the upper portion of said chamber, a gas producer connected to the lower portion of said chamber, a gas regenerator means connected to an intermediate portion of said chamber to said regenerator, means for causing gas to be withdrawn from the chamber through said last named means into said generator, and a conduit connecting the regenerator to the gas producer.

5. An apparatus of the kind defined by claim 4 having means for introducing air to the upper portion of said chamber.

In testimony whereof I have affixed my signature in the presence of two witnesses.

FRANS MARTIN WIBERG.

Witnesses:
AXEL EHRNER,
GRETA PRIEN.